United States Patent Office 3,049,754
Patented Aug. 21, 1962

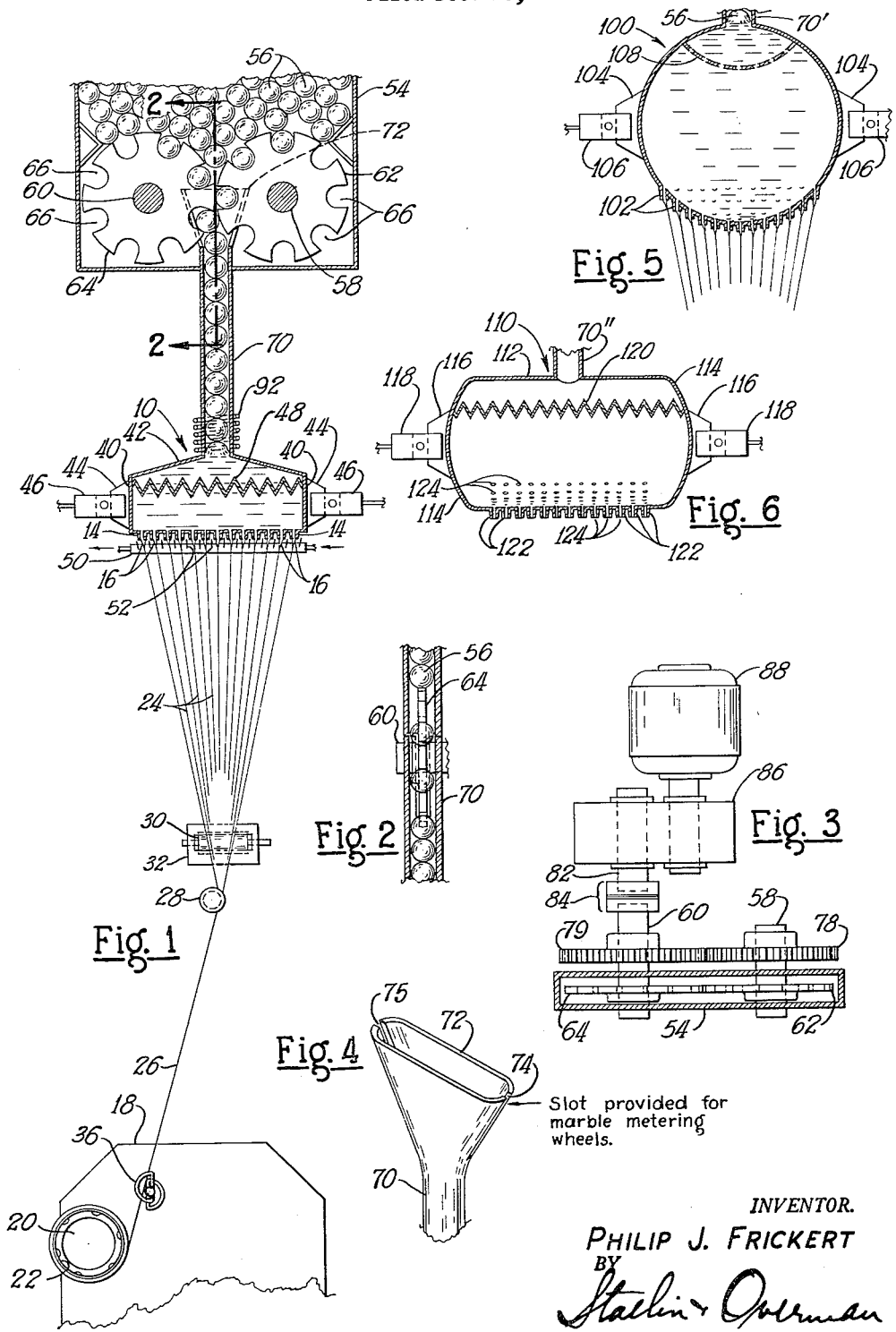

3,049,754
METHOD AND APPARATUS FOR PROCESSING HEAT-SOFTENABLE MATERIALS
Philip J. Frickert, Anderson, S.C., assignor to Owens-Corning Fiberglas Corporation, a corporation of Delaware
Filed Dec. 29, 1959, Ser. No. 862,549
8 Claims. (Cl. 18—8)

This invention relates to method and apparatus for processing heat-softenable materials and more especially to a method and apparatus for feeding discrete bodies into a chamber and reducing the material of the bodies to a heat-softened flowable condition while subjected to pressure whereby streams of the heat-softened material are extruded from orifices in the chamber.

Textile materials have been manufactured of strands, yarns or threads formed of glass fibers or filaments, the filaments or fibers being formed by flowing streams of heat-softened glass by gravity from orifices in a feeder and attenuating the streams to comparatively fine filaments. In such methods the feeder is heated, usually by electrical means, to maintain as far as practicable a substantially uniform temperature and hence, substantially uniform viscosity throughout the regions of the feeder.

It is well known that the viscosity of heat-softened or flowable glass varies substantially under minor temperature variations resulting in variations in viscosity of the heat-softened glass in a feeder, and such variations affect the viscosity of the streams and hence the flow rate of the glass delivered through orifices from various regions of the feeder. Nonuniformity of the characteristics of the streams results in differential sizes of filaments attenuated therefrom and, in production, the filament sizes in a linear group or strand of filaments attenuated from streams from a feeder may vary appreciably, resulting in a coefficient of variation in yardage in packages of the strand as high as ten percent. While the size variations among the several filaments making up a strand may be relatively small, the differentials in overall weight of the yardage in packages is substantial.

The present invention embraces a method of processing heat-softenable mineral material such as glass whereby more uniform strands of filaments of the material may be obtained from a feeder.

An object of the invention resides in a method of processing heat-softenable glass or other mineral material to effect the delivery of more uniform streams of material from a feeder whereby minor variations in viscosity of the material of the several streams has a reduced effect upon the characteristics of the filaments attenuated therefrom whereby the coefficient of variation in total yardage of multifilament strand is substantially reduced.

Another object of the invention resides in a method involving the feeding of discrete rigid bodies of heat-softenable material into a chamber under pressure, and softening the material of the bodies in the chamber to a molten condition whereby to extrude streams of the material under pressurized conditions in the chamber.

Another object of the invention resides in an apparatus for feeding discrete rigid bodies of heat-softenable material into a chamber at a controlled rate to positively replace heat-softened material discharged in the form of a plurality of streams from the chamber whereby to secure more uniform throughput of glass delivered from the chamber with a consequent reduction in yardage variations in multifilament strand formed from the streams.

Another object of the invention resides in an apparatus for feeding discrete bodies of glass or other heat-softenable material of substantially uniform size into a heated pressurized chamber through a passage accommodating the bodies of a dimension whereby the softening of the lowermost bodies or pieces at the exit of the passage provides a viscous seal effective to maintain pressure in the chamber.

Another object of the invention is the provision of a feeding means for delivering spherically-shaped rigid bodies of heat-softenable material into a confined chamber in which the bodies are heat-softened to a molten state, the feeding means being operative to positively deliver the bodies into the confined chamber at a rate to replace the molten material delivered from the chamber through orifices.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic elevational view illustrating a form of apparatus for performing steps in the method of the invention;

FIGURE 2 is a transverse sectional view taken substantially on the line 2—2 of FIGURE 1;

FIGURE 3 is a plan view of the supply receptacle and material delivering means shown in FIGURES 1 and 2;

FIGURE 4 is an isometric view of a material guide means;

FIGURE 5 is a transverse sectional view illustrating a modified form of stream feeder or chamber, and FIGURE 6 is a sectional view illustrating another form of stream feeder or chamber.

The method and apparatus of the invention are particularly usable for establishing a constant rate of feed or delivery of discrete rigid bodies of glass or other heat-softenable material into a feeder chamber and it is to be understood that the method and apparatus of the invention may be employed wherever a positive pressure feed is requisite or desirable in feeding bodies of other materials to a confined zone or chamber.

In the embodiments of the invention illustrated in the drawings, the discrete bodies formed of heat-softenable mineral material such as glass are of spherical shape or marble form, but it is to be understood that bodies of other shape or configuration of identical size may be utilized in the process of the invention.

Referring to the drawings in detail and initially to the form of apparatus illustrated in FIGURE 1, this arrangement is especially adapted for feeding marbles or spherically-shaped rigid bodies of glass into a closed chamber from which streams of glass are extruded under pressure and attenuated into fine filaments which are converged into a strand and packaged. As shown in FIGURE 1, the arrangement includes a combined melting chamber and stream feeder 10 having a lower wall or floor 12 provided with a plurality of projections or tips 14, each tip being fashioned with a small orifice.

Bodies of glass delivered into the feeder 10 are heated therein to a softened or molten condition and streams of the flowable glass 16 extruded through the orificed tips 14. Disposed beneath the feeder 10 is a housing 18, and journally supported upon the housing is a rotatable arbor or mandrel 20 adapted to support a packaging sleeve 22 upon which a strand 26 of filaments 24 is wound, the mandrel 20 being rotated by a motor or other suitable means contained within the housing 18. The filaments 24 formed from the streams 16 are converged into the strand 26 by means of a grooved member or filament gathering surface 28.

If desired, a coating of size, lubricant or other coating material may be applied to the filaments 24 through an applicator roll or member 30 associated with a receptacle 32 containing filament coating material. The roll 30 is rotated by suitable means (not shown) and thereby acquires a film of the coating material which is transferred to the filaments 24 through wiping contact of the filaments with the film of material on the applicator roll 30.

The strand 26 is traversed lengthwise of the packaging sleeve 22 by means of a traverse means or member 36 which is rotated and reciprocated by a suitable means contained within the housing 18 and driven by the motor employed for rotating the mandrel 20. The mandrel 20 and the packaging sleeve 22, which is removably supported by the mandrel, are driven at a speed to advance the strand 26 at a linear speed of ten thousand or more feet per minute depending upon operating conditions and the fineness of the filaments 24 to be formed from the streams.

The feeder or chamber 10 in the embodiment illustrated in FIGURE 1 is of elongated generally rectangular shape having end walls 40 and an upper wall or closure plate 42. The melting chamber and stream feeder 10 is unvented to provide a confined zone and is electrically heated, the end walls 40 being provided with lugs or terminals 44 engaged by conductors 46 for conducting current to the chamber, the resistance to the passage of current supplying heat for heat-softening or rendering molten the bodies of glass or other material delivered into the chamber.

The chamber 10 is formed of metal or alloy capable of withstanding the high melting temperatures, and an alloy of platinum rhodium or platinum iridium is satisfactory for the purpose. A perforate screen 48 is disposed across the chamber 10 to prevent partially softened particles or pieces of the glass from moving into the lower or stream feeding region of the chamber. The screen 48 is preferably of zigzag shape to present substantial resistance to the passage of current to assist in generating heat in the chamber.

It has been found preferable to elevate the temperature of the glass within the chamber to render the softened glass of low viscosity or highly liquidous in its consistency to provide for improved delivery of streams of the glass of more uniform size through the orificed tips 14. In order to satisfactorily attenuate the streams to filaments, it is essential to withdraw heat from the streams to increase the viscosity and thereby render the glass more attenuable.

To accomplish this purpose, a heat absorbing device or cooling means is disposed adjacent the delivery region of the streams and comprises a tubular manifold 50 equipped with transversely extending heat-transferring metal vanes or fins 52 arranged between transverse rows of the glass streams, the fins absorbing heat from the streams which is conducted to the manifold 50. A heat absorbing fluid, such as water, is continuously circulated through the tubing member or manifold 50 for conveying away the heat absorbed from the streams. Through this arrangement the viscosity of the material of the streams is increased preparatory to attenuation.

Heretofore, it has been a practice to periodically or intermittently deliver spherically shaped rigid bodies or marbles of glass by gravity into a feeder to replace the glass of the streams. Such method of delivery of marbles included gating means intermittently operable for releasing a marble or body into the feeder at a rate generally proportional to the rate of discharge of the glass through the orifices. In such method variations in viscosity throughout the glass in the feeder result in variations in viscosity of the several streams with consequent differentials in the sizes of filaments attenuated therefrom.

In the present invention, the spherically shaped bodies or marbles of glass are effectively delivered at a controlled rate so as to secure positive replacement of the glass discharged through the orificed tips. Disposed above the feeder or chamber 10 is a receptacle 54 of rectangular shape adapted to contain a supply of glass marbles or bodies 56. Disposed within the receptacle 54 are shafts 58 and 60 arranged in parallelism adapted to be driven by a motor through a suitable gear reduction mechanism at a comparatively low speed.

Mounted upon the shaft 58 is a disc or feed wheel 62, and mounted on the shaft 60 is a second disc or feed wheel 64, the marble feed wheels being of identical diameters. Each of the feed wheels 62 and 64 is fashioned with peripherally spaced recesses or open slots 66 of identical size to accommodate marbles 56 of glass which are of equal size. Each slot 66 is of a dimension to snugly, yet slidably, receive a marble so that the marbles may be discharged from the slots into column formation without lost motion.

As shown in FIGURE 1, the feed wheels are mated without interenmeshment whereby slots of the opposing wheels 62 and 64 are in staggered relation in order to establish a positive continuous feed or marbles. Disposed between the receptacle 54 and the feeder chamber 10 is a tubular member or guide 70 which is in communication with the chamber 10 through an opening in the cover 42, the tubular member 70 being connected with the chamber cover by a sealed joint or may be welded to the cover.

The upper end of the tubular guide member 70 extends into the marble supply receptacle 54 and is formed with a funnel-like portion 72 elongated in a lateral direction, the funnel-shaped portion 72 being formed with slots 74 and 75, the slot 74 accommodating the feed wheel 62 and the slot 75 accommodating the feed wheel 64. It should be noted that the funnel portion or entrance region 72 of the tubular guide means 70 is elongated in the direction of the plane of the feed wheels and the elongated entrance being of a dimension to admit the entrance of marbles carried in the slots 66 of the wheels at their nip region.

The cross-sectional configuration of the marble guide tube 70 is such as to snugly, yet slidably, accommodate the marbles 56 so that a positive pressure may be exerted through the stack or single file column of marbles in the guide tube under the influence of the rotation of the feed wheels 62 and 64. A suitable driving means is provided for the feed wheels 62 and 64, one form of drive means being illustrated in FIGURE 3. The shafts 58 and 60 are provided respectively with intermeshing gears 78 and 79 of identical size and number of teeth whereby the feed wheels are rotated in opposite directions at identical speeds.

Disposed in alignment with the shaft 60 is a shaft 82 which is operatively connected with the shaft 60 through a friction or slip clutch 84 which may be conventional construction and is adjustable so as to slip when the transmitted torque exceeds a predetermined value. The shaft 82 is driven through a suitable speed reducing gearing or mechanism indicated schematically at 86, the end shaft of the speed reducing mechanism being driven by a motor 88. The speed reducer 86 may be of the variable speed type, or the drive motor 88 may be of a variable speed type, for varying the speed of the driving shafts 58 and 60 and hence the speed of the marble feed wheels 62 and 64.

The rectangularly-shaped hopper or receptacle 54 is of a transverse dimension slightly greater than the diameters of the bodies or marbles 56 of glass so that the stacked marbles within the hopper are in a plane of the axes of the marbles. Through this arrangement the marbles readily enter the slots 66 in the feed wheels as the wheels are rotated.

The speed of the feed wheels is regulated, either through the speed reducer 86 or the drive motor 88, so that the delivery of marbles through the feed chute 70 into the feeder 10 is at a rate to positively replace the glass in the feeder discharged through the orificed tips 14 with a comparatively light pressure exerted upon the glass within the feeder through the medium of the single file column of marbles in the guide tube under the pressure of rotation of the feed wheels. The pressure exerted by the feed wheels may be regulated by adjusting the clutch 84 to slip under a predetermined torque.

The operation of the arrangement shown in FIGURES 1 through 4 is as follows: As the feed wheels 66 are rotated, marbles from the supply in the receptacle 54 enter the slots as the wheels move through the supply, whereby each slot in the wheels, on approaching the entrance 72 of the tube 70, is provided with a marble 56. As the slots of the feed wheels are in staggered relation, the successive marbles from the wheels are forced into the entrance of the tube 70 so that constant pressure is transmitted to the column of marbles in the tube 70 to secure a constant rate of delivery of marbles into the chamber or feeder 10 under predetermined pressure.

As the feeder 10 is continuously heated electrically or by other means, the lowermost marble of the column in the tube 70 is heat-softened as it enters the chamber and is of a highly viscous character so that it effects a seal of heat-softened glass at or adjacent the juncture of the tube 70 with the chamber so that the molten or flowable glass in the feeder is maintained under pressure of the marbles in the tube 70.

Under the pressure existent within the feeder or chamber 10, the molten glass beneath the screen 48 is extruded or discharged through the orificed tips 14, providing improved uniformity in the size of the streams by reason of the pressure established in the feeder under the influence of the forced feed of marbles through the guide tube 70. The streams are attenuated to filaments by reason of the high speed of winding the filaments upon the packaging sleeve 22 mounted by the rotating arbor 20.

A coating or size may be applied to the fan of filaments by the applicator 30, the coated filaments converging to a strand 26 by the filament gathering surface 28 and the strand traversed lengthwise of the package by the reciprocatory and rotary movement of the strand traverse means 36.

Through this arrangement more uniform streams are delivered through the orificed tips 14 and a constant throughput of glass delivered from the feeder, hence more uniform yardage or yardage with a reduced coefficient of variation is attained in the package. The viscosity of the streams 16 of glass adjacent the feeder is increased through the absorption of heat by the fins or vanes 52 transferred to the fluid in the manifold 50 to render the glass of the streams suitable for satisfactory attenuation. The screen 48 within the feeder 10 prevents the passage of particles or pieces of glass until the pieces or marbles have been reduced to a molten or flowable condition.

Under certain operating conditions, in order to provide a proper seal of viscous glasses adjacent the lowermost marble in the guide tube 70, it may be desirable to apply additional heat to the lower end region of the tube 70 or to apply a circulating cooling medium in order to reduce the temperature adjacent the lowermost marble in the column of marbles in the tube 70. If additional heat is required the component 92 surrounding the tube 70 may be an electrically energized coil for inductively heating the tube. If cooling is required at this region of the tube 70, the component 92 may be a cooling coil accommodating a circulating cooling fluid such as water for absorbing heat from the lowermost region of the tube 70.

An essential factor in the successful operation of the method requires the use of marbles or pieces of glass of predetermined uniform standard both as to size and weight. The marbles or spherical bodies, where such are to be used in the method, are first screened as to size as it is important in maintaining pressure through the column of marbles in the tube 70 by the feed wheels that the diameters of the marbles be uniform.

Nonuniformity in marble size would result in release of pressure on the glass within the chamber 10 because of ineffective positive transfer of pressure through the column of marbles by the feed wheels. It is further desirable that the screened marbles of uniform size be weighed in order to classify the marbles of uniform weight so as to assure a uniformity in the weight of glass delivered through the stream feeder 10 in a given time. By grading the bodies or marbles, the amount of glass attenuated in a given length of time is maintained constant and even though there may be minor variations in the size of the filaments in the strand, the coefficient of variation in the total yardage is greatly reduced over prior methods.

It is essential to maintain pressure on the marbles constantly by the feed wheels so that the pressure within the feeder chamber 10 is maintained above atmospheric pressure and a positive displacement is assured of the material delivered from the feeder chamber. The slip clutch or torque control coupling 84 should be adjusted to provide a release should an excessive pressure develop in the feeder chamber.

The metal of the feeder 10 being at a very high temperature and hence more susceptible to distortion necessitates limiting the pressure on the glass within the feeder as an excess of pressure would tend to distort the intensely hot metal of the feeder.

FIGURE 5 is illustrative of another form of melter and stream feeder or bushing. In the arrangement shown in FIGURE 5, the feeder 100 is of susbtantially spherical shape. The lower spherical segment wall region of the feeder 100 is provided with a plurality of orificed tips 102 through which streams of glass or other heat-softened fiber-forming material are extruded, the streams being attenuated to filaments by strand collecting means such as that illustrated in FIGURE 1.

The sperically shaped feeder 100 is provided with diametrically opposed terminals or lugs 104 to which current conductors 106 are connected for supplying electric current to the feeder for heating the pieces of glass in the feeder to melt the same and maintain the heat-softened glass in a flowable condition. A perforate screen 108 is provided at the upper region of the feeder to prevent pieces of marbles from moving into the lower region of the feeder.

A tubular guide member 70′ is welded or otherwise secured to the upper portion of the feeder 100 whereby the marbles 56 may be delivered into the feeder under the pressure of the feeding wheels of the character shown in FIGURE 1 and pressure maintained in the feeder.

By reason of the spherical shape of the feeder 100, it is adaptable to withstand higher internal pressure without appreciable distortion. The spherically shaped feeder shown in FIGURE 5 may be employed to advantage where it is desirable to establish higher pressures within the feeder.

FIGURE 6 illustrates another form of melter and stream feeder. In this form, the feeder or chamber 110 is in the shape of an elongated cylinder 112 having convexly curved end walls 114. A marble guide tube 70″ is in communication with the chamber at its upper region and the tube is welded or otherwise secured to the cylinder 112 to form a sealed joint. The convexly curved end walls are provided with terminals or lugs 116 with which current conductors 118 are connected for supplying current to the feeder in order to generate heat for reducing the marbles or discrete bodies of glass to a flowable state.

A perforated screen 120 extends across the feeder preferably above the mid region thereof as illustrated to prevent the passage of pieces of glass into the lower zone of the feeder. The curved bottom region of the feeder is provided with a plurality of projections 122, the projections being formed with orifices 124 through which streams of the heat-softened or molten glass or other mineral material are extruded from the feeder. The arrangement shown in FIGURE 6 is usable with the marble feeding apparatus shown in FIGURE 1. The cylindrical feeder having convexly curved end walls provides a configuration which is resistant to distortion under pressures developed within the chamber.

The method of the invention improves control of the glass streams and provides a substantially constant throughput of glass thus reducing the coefficient of variation in yardage of multifilament strand. An advantage is attained in the maintenance of constant temperature within the combined melter and feeder chamber. As the marbles of glass of uniform size are advanced into chamber at a constant rate, the glass in the feeder is not subjected to thermal shock as in other methods wherein bodies or marbles are intermittently fed into a melter chamber by gravity. This factor is influential in minimizing variations in the viscosity of the glass in the feeder and in the streams discharged therefrom.

It is apparent that, within the scope of the invention, modifications and different arrangements may be made other than as herein disclosed, and the present disclosure is illustrative merely, the invention comprehending all variations thereof.

I claim:

1. Apparatus of the character disclosed, in combination, a receptacle adapted to contain a supply of discrete spherically-shaped bodies of heat-softenable material, a chamber having a plurality of orifices formed in a wall thereof, a feed channel in communication with said chamber and said supply receptacle, a pair of feed wheels engageable with the bodies for feeding the bodies successively through the channel into the chamber, means for actuating said feed wheels to exert continuous pressure upon the bodies in the feed channel, and means for applying heat to reduce the material of discrete bodies in the chamber to a heat-softened state whereby streams of the heat-softened material are extruded through the orifices by the pressure exerted on the bodies.

2. Apparatus of the character disclosed, in combination, means adapted to contain a supply of spherically-shaped discrete bodies of heat-softenable mineral material, a chamber having a plurality of orifices formed in a wall thereof, tubular guide means in communication with said chamber and said supply means adapted to direct bodies from the supply toward the chamber, a plurality of rotatable feed wheels, means for rotating the feed wheels to orient the bodies in the guide means and for feeding the bodies successively into the chamber, said chamber being otherwise unvented, means for controlling the means for rotating the feed wheels to limit the pressure exerted on the bodies in the guide means, means for flowing electric energy through the chamber to reduce the material of the bodies to a heat-softened state whereby streams of the heat-softened material are extruded under the influence of pressure exerted on the bodies, and means for attenuating the streams to filaments and collecting the filaments in a package.

3. Apparatus of the character disclosed, in combination, means adapted to contain a supply of spherically-shaped discrete bodies of glass, a combined melter and feeder chamber having a plurality of orifices formed in a wall thereof, a tubular channel in communication with said chamber and said supply means of a cross-section to accommodate a single file column of the bodies, a pair of feed wheels for continuously feeding the bodies successively through the tubular channel into the chamber, driving means arranged to rotate the feed wheels for exerting pressure upon the column of bodies in the channel, means for limiting the pressure on the column of bodies, and heating means for reducing the glass bodies in the chamber to a heat-softened state whereby streams of the softened glass are extruded under the influence of the pressure exerted on the column of bodies.

4. Apparatus of the character disclosed, in combination, a tubular guide adapted to contain a column of spherically-shaped discrete bodies of heat-softenable mineral material, a chamber having a wall portion provided with a plurality of orifices, said tubular guide being connected with said chamber, a pair of feed wheels having recesses to accommodate the discrete bodies for orienting bodies from a supply in the tubular guide and feeding the bodies of the column successively into the chamber, actuating means for the body feeding wheels adapted to exert pressure on the bodies in the tubular guide, means for applying heat to the bodies in the chamber for reducing the material of the bodies to a heat-softened condition, means for controlling the temperature of the entrance region of the tubular guide into the chamber for establishing a seal of the material in the entrance region, said chamber being unvented whereby streams of the heat-softened material are extruded through the orifices under the influence of pressure exerted on the bodies in the tubular guide.

5. Apparatus of the character disclosed, in combination, a receptacle adapted to contain a supply of spherically-shaped discrete bodies of heat-softenable mineral material, a chamber having a wall portion provided with a plurality of orifices, a tubular guide arranged between said receptacle and said chamber, means including rotatable members having recesses accommodating the discrete bodies for feeding the bodies from the receptacle into the tubular guide in single file column formation, actuating means for the body feeding means adapted to exert pressure on the bodies in the tubular guide, means associated with the actuating means for regulating the pressure on the bodies, means for applying heat to the bodies in the chamber for reducing the material of the bodies to a heat-softened condition, said chamber being unvented whereby streams of the heat-softened material are extruded through the orifices under the influence of pressure exerted on the bodies in the tubular guide, and means for attenuating the streams to continuous filaments.

6. A method of processing heat-softenable mineral material including establishing a supply of rigid, spherically-shaped discrete bodies of the material, engaging the bodies in the supply by moving surfaces to successively orient the bodies in single column formation and advance the bodies in the column formation into an unvented chamber, continuously moving the body engaging surfaces at a controlled rate whereby to exert constant pressure on the bodies in the column formation, applying heat to the chamber to successively reduce to a heat-softened condition the bodies of the column formation as they enter the chamber, and extruding streams of the heat-softened material from the chamber through orifices in a wall of the chamber.

7. A method of processing heat-softenable mineral material including establishing a supply of rigid, spherically-shaped discrete bodies of the material, successively orienting the bodies of the supply in a single column formation in a channel, engaging the uppermost of the bodies in the column by a moving surface, moving the surface in a direction and at a controlled rate to exert constant pressure on the column of bodies to advance the bodies of the column into an unvented chamber, applying heat to the chamber to successively reduce to a heat-softened condition the bodies of the column as they enter the chamber under the influence of the pressure of the moving surface, and extruding streams of the heat-softened material from the chamber through orifices in a wall of the chamber.

8. A method of forming continuous filaments of glass including establishing a supply of spherically-shaped bodies of glass of identical size, engaging the bodies in the supply by moving surfaces to successively orient the bodies in a single column formation and advance the bodies in the column formation into an unvented chamber, continuously moving the surfaces at a controlled rate to exert constant pressure on the bodies in the column formation, flowing electric energy through the chamber to reduce the bodies to a molten state as they are forced into the chamber, extruding streams of the molten glass under the influence of the pressure on the column of bodies, and attenuating the streams of glass to filaments by winding the filaments into a package.

References Cited in the file of this patent

UNITED STATES PATENTS

| | | |
|---|---|---|
| 2,369,506 | Weibel | Feb. 13, 1945 |
| 2,495,956 | Cook | Jan. 31, 1950 |
| 2,635,389 | Toulmin | Apr. 21, 1953 |
| 2,657,428 | Upton | Nov. 3, 1953 |
| 2,780,890 | Russell | Feb. 12, 1957 |

FOREIGN PATENTS

| | | |
|---|---|---|
| 1,008,738 | France | Feb. 27, 1952 |
| 744,973 | Germany | Feb. 21, 1944 |
| 938,745 | Germany | Feb. 9, 1956 |